US012696357B2

(12) United States Patent
Lim et al.

(10) Patent No.: US 12,696,357 B2

(45) Date of Patent: Jul. 28, 2026

(54) AEROGEL BLANKET INSULATOR AND ITS FUNCTIONAL COMPOSITE

(71) Applicant: NDT ENGINEERING & AEROSPACE CO., LTD., Changwon-si (KR)

(72) Inventors: Ki Hyun Lim, Changwon-si (KR); Young Su Cho, Changwon-si (KR); Chi Woo Noh, Gyeongsangnam-do (KR)

(73) Assignee: NDT ENGINEERING & AEROSPACE CO., LTD., Changwon-si (KR)

( * ) Notice: Subject to any disclaimer, the term of this patent is extended or adjusted under 35 U.S.C. 154(b) by 652 days.

(21) Appl. No.: 18/035,320

(22) PCT Filed: Nov. 18, 2020

(86) PCT No.: PCT/KR2020/016216
§ 371 (c)(1),
(2) Date: May 4, 2023

(87) PCT Pub. No.: WO2022/107904
PCT Pub. Date: May 27, 2022

(65) Prior Publication Data
US 2023/0413390 A1 Dec. 21, 2023

(51) Int. Cl.
*H05B 3/34* (2006.01)
*A01G 9/14* (2006.01)
(Continued)

(52) U.S. Cl.
CPC ........... *H05B 3/342* (2013.01); *A01G 9/1438* (2013.01); *A47G 9/0215* (2013.01); *B32B 3/04* (2013.01); *B32B 5/022* (2013.01); *B32B 5/18*

(2013.01); *B32B 5/245* (2013.01); *B32B 5/266* (2021.05); *B32B 2255/02* (2013.01); *B32B 2255/205* (2013.01); *B32B 2260/021* (2013.01); *B32B 2260/046* (2013.01); *B32B 2262/062* (2013.01);
(Continued)

(58) Field of Classification Search
CPC ...... A47G 9/0215; B32B 27/065; B32B 3/04; B32B 5/022; H05B 3/36; H05B 3/342
See application file for complete search history.

(56) References Cited

U.S. PATENT DOCUMENTS

2002/0187699 A1 12/2002 Takeda et al.
2014/0255642 A1* 9/2014 White .................... C08G 73/10
428/317.9

FOREIGN PATENT DOCUMENTS

CN 208891091 U * 5/2019
CN 210065154 U * 2/2020
(Continued)

OTHER PUBLICATIONS

International Search Report for PCT/KR2020/016216 mailed Aug. 18, 2021 from Korean Intellectual Property Office.

*Primary Examiner* — Thien S Tran
(74) *Attorney, Agent, or Firm* — Revolution IP, PLLC

(57) ABSTRACT

This invention relates to functional composites that consist of an insulator and other functional elements associated with it. Specifically, this invention is relevant to functional composites that consist of an aerogel insulator and a functional heating element to increase thermal efficiency while supplying heat to the targeted object and keeping it warm.

7 Claims, 7 Drawing Sheets

(51) Int. Cl.

| | | |
|---|---|---|
| *A47G 9/02* | (2006.01) | |
| *B32B 3/04* | (2006.01) | |
| *B32B 5/02* | (2006.01) | |
| *B32B 5/18* | (2006.01) | |
| *B32B 5/24* | (2006.01) | |
| *B32B 5/26* | (2006.01) | |

(52) U.S. Cl.
   CPC ... *B32B 2266/126* (2016.11); *B32B 2307/202* (2013.01); *B32B 2307/304* (2013.01); *H05B 2203/02* (2013.01)

(56)                    References Cited

FOREIGN PATENT DOCUMENTS

| | | | | | |
|---|---|---|---|---|---|
| CN | 211968648 | U | * | 11/2020 | |
| JP | 2000-280389 | A | | 10/2000 | |
| JP | 2009-299893 | A | | 12/2009 | |
| JP | 2010-038288 | A | | 2/2010 | |
| KR | 10-2013-0001469 | A | | 1/2013 | |
| KR | 10-2014-0039493 | A | | 4/2014 | |
| KR | 101912455 | B1 | * | 10/2018 | ........... B32B 27/283 |
| KR | 10-1912011 | B1 | | 12/2018 | |
| WO | WO-2019079893 | A1 | * | 5/2019 | ............... H05B 3/36 |

* cited by examiner

AEROGEL BLANKET INSULATOR AND ITS FUNCTIONAL COMPOSITE

TECHNICAL FIELD

This invention relates to functional composites that consist of an insulator and other functional elements associated with it. Specifically, this invention is relevant to functional composites that consist of an aerogel insulator and a functional heating element to increase thermal efficiency while supplying heat to the targeted object and keeping it warm.

BACKGROUND ART

Energy efficiency has become an issue of consideration throughout the industry with the goal to save limited resources, and an insulator is commonly used as a method to increase energy efficiency. Therefore, various structures and manufacturing methods for these materials that make up the insulator are under research and development.

Super-insulating materials are highly efficient and they can be applied to various uses by increasing machinability and reducing weight and volume. Its wide application has allowed for many researches and developments to be conducted recently. Super-insulating materials can be processed with qualities of other materials to form a functional product with convergence materials that are capable of giving appropriate functions accordingly.

The advantage of super-insulating convergence materials includes a function that can respond to extreme temperature conditions and environments using its super-insulating features and innate properties of the material. For example, convergence materials that can endure high temperatures can be used in various applications including social and public fields of firefighting, flame retardant in the defense industry, insulation fields, eco-friendly insulation, and heat radiation fields, curtains in construction and agricultural facilities, insulation for industrial steelmaking, smelting, shipbuilding, automobiles, and offshore plants.

Recently, the manufacture and application of super-insulating materials, such as aerogel, have become a subject of interest in relation to outdoor, functional clothing, and functional industrial materials due to their excellent insulation effects even with a thin thickness.

Aerogel is a super-porous material that has nanopores of about 20 to 50 nm with a porosity of at least 95%. It is created using a nanostructured gel containing a large amount of solvent based on the sol-gel reaction of raw materials, and the solvent is removed with almost no shrinkage using supercritical drying to maintain the nanostructure of the original gel.

The extremely low thermal conductivity of aerogels and their high porosity is caused by the blocking effect of air molecule movements in the gas due to the unique nano-porous structure.

These aerogels are generally a type of porous silicon particles and they have an excellent insulation effect due to their large porosity. However, manufacturing and processing products with this fabric are very difficult because their extremely small particles scatter throughout the workspace and they escape from the insulator, thus weakening the insulation function.

The aerogel particles can be wrapped with a particle-impermeable cover to inhibit aerogel particles from passing through to prevent the aerogel particles from contaminating the workspace, which would make work difficult.

However, in this case, it is difficult to maintain an even thickness because particles are randomly concentrated or escaped from a certain location within the wrapped space, the material is processed by cutting or bending, and the cover itself becomes damaged. As a result, issues such as contamination of the surroundings and loss of insulation function are still likely to occur.

Methods of creating an insulating material to resolve or alleviate these issues are listed in Korean Patent Publication No. 10-2014-0039493 and Korean Patent Registration No. 10-1912011. In these documents, the aerogel layer is divided into small sections of the total area that makes up the aerogel layer and becomes limited as shown in Drawings 1 or 2 and becomes confined within the compartments, and the sections are then separated into regions with a specific width.

However, problems concerning material processing still arise even with these technologies available, and the constitution process of such a structure itself is often costly and time-consuming. In addition, aerogels are now often used in the form of an aerogel blanket that is impregnated with aerogel or layered with fiber. However, in this case, it may become more difficult to create a fabric consisting of such a composition of compartments.

On the other hand, when materials are created using aerogel and these are used to form outdoor products or other functional products, the excellent insulation of aerogel can increase the thermal insulation power of the product in a low-temperature environment. However, it is difficult to prevent heat from escaping from subjects to be kept warm for a long time and it may require supply of the heat energy itself, even in small amounts.

Drawing 3 shows a cross-sectional configuration of a functional composite that combines a heat insulator and a heating element to supply heat in response to these needs.

In addition, if this heat supply becomes confined only to a specific part, that part may cause discomfort or damage to the functional product itself or the user of functional clothing due to overheating, and other parts may cause discomfort or damage due to low-temperature conditions as a result of insufficient heat supply.

Also, heat loss to the exterior environment may be the major issue in a place where heat is concentrated due to a large temperature difference in this part even with the insulator blocked, which increases the possibility of the overall heat conservation and insulation efficiency to decrease as a result.

In order to avoid this issue, transferring heat relatively evenly throughout general functional products including the thermal insulators may be requested.

DETAILED DESCRIPTION OF THE INVENTION

Technical Problems

This invention aims to provide an aerogel insulator and relevant functional composites that use such materials that can resolve or alleviate the existing issues stated previously.

This product aims to provide an aerogel insulator and relevant functional composites that can alleviate the corresponding issue of aerogel particles scattering and contaminating the surrounding workspace and escaping from the insulator to deteriorate the insulation function during manufacturing and processing of insulation materials when using aerogel blankets for insulators.

It aims to provide an aerogel insulator and relevant functional composites with a configuration that makes it easy to maintain the uniformity of aerogel particle distribution within the insulator and also relatively easy to process it by bending or folding.

When the aerogel blanket material consists of cotton-type insulation, it aims to provide an aerogel insulator and relevant functional composites in which the aerogel formed on the aerogel blanket is not partially slanted or weighted and is without aggregation or deformation of the material even when the materials are bent, folded, or with external pressure during washing.

An additional aspect of this invention, it aims to provide an aerogel insulator with a configuration that can easily maintain temperature and relevant functional composite by providing heat evenly to the interior space where functional products are kept warm and insulated using an insulator material even if they are exposed to a relatively long period of time in a low-temperature environment.

Technical Solution

The insulator of this invention with the goal to achieve the above purpose includes an aerogel blanket formed by including aerogel particles, a sewing thread used to quilt the aerogel blanket, and a cover layer that covers the surface of the aerogel blanket, and a unique property of the above aerogel blanket includes insulation of elastic member and the sewing thread is confined to quilt only the aerogel blanket.

The heat insulator in this invention includes a feature equipped with a separate enveloping layer that covers the above cover layer and the elastic member is equipped in the form of cotton.

In this invention, the cover layer is formed by penetrating liquid synthetic resin through a partial thickness of the aerogel blanket, and the cover layer is created by applying liquid polyimide or synthetic resin on the surface of the aerogel blanket, or by combining non-woven fabric or thin fabric on top of the layer made of the liquid polyimide or synthetic resin again. A unique characteristic of the aerogel blanket insulator above includes the sewing thread created using impregnated liquid polyimide or synthetic resin.

As a functional composite with the heat insulator of this invention, its unique characteristic includes an extraplanar heating element layer on top of the cover layer on a single side of the aerogel blanket.

In this invention, a unique characteristic of the planar heating element layer includes a resistive conductive layer that generates heat when current flows, and it is formed to cover the entire surface or according to a pattern of the material or formation by either attachment, printing, and coating according to a specific pattern.

The planar heating element in this invention consists of a metal thin film or is created by applying and drying a viscous liquid with conductive particles or fibers. The planar heating element forms a sewing thread on a single side as a conductive resistor while using a separate sewing thread on the top and bottom of the aerogel blanket.

In this invention, the planar heating element is formed by distributing at least two electric terminals in multiple places, and a unique feature of the planar heating element includes its formation using PTC heaters made at least in part from PTC (positive temperature coefficient) materials.

Effects of Invention

This invention aims to alleviate the corresponding issue of aerogel particles scattering and contaminating the surrounding workspace and escaping from the insulator to deteriorate the insulation function during manufacturing and processing when using aerogel blankets for the production of insulators or functional composites equipped with them.

According to this invention, it makes it easy to maintain the uniformity of aerogel particle distribution overall in the production of insulators or functional composites equipped with them, and partially, with a thin form of the stitched part, it is also relatively easy to process it by bending or folding, which eventually reduces the cost and labor required by the manufacture of these products.

In particular, when the aerogel blanket material is composed of cotton-type insulation, its durability can be enhanced to provide an aerogel insulator in which the aerogel formed on the aerogel blanket is not partially slanted or weighted and is without aggregation or deformation of the material even when the materials are bent, folded, or with external pressure during washing.

According to an additional aspect of this invention, the temperature can be maintained in a suitable range by providing heat evenly to the interior space where functional products are kept warm and insulated using an insulator material and a planar heating element evenly distributed throughout the space even if they are exposed to a relatively long period of time in a low-temperature environment.

BRIEF DESCRIPTION OF DRAWINGS

Drawing 1 shows a sectional side view of a conventional insulator equipped with a planar heating element, Drawing 2 shows a plan view of a heat insulator as a conventional example where the aerogel is divided into sections with each of them separated by areas with a width between them, Drawing 3 shows a distribution of aerogel-covered packs on the surface with these covers divided into sections containing the packs and a sectional side view of a heat insulator showing another conventional example with areas for separation between them, Drawing 4 is a plan view of an embodiment of this invention, Drawing 5 is a sectional side view of an embodiment of this invention, Drawing 6 is a sectional side view of another embodiment of this invention, Drawing 7 is a sectional side view from another location where the quilting thread penetrates the aerogel blanket and the polyimide cover layer in the embodiment of Drawing 6, Drawing 8 is a sectional side view of another embodiment of this invention, Drawing 9 is another perspective view of an example of the planar heating element layer configuration of the embodiment.

MODE FOR IMPLEMENTATION OF INVENTION

Figure 1:
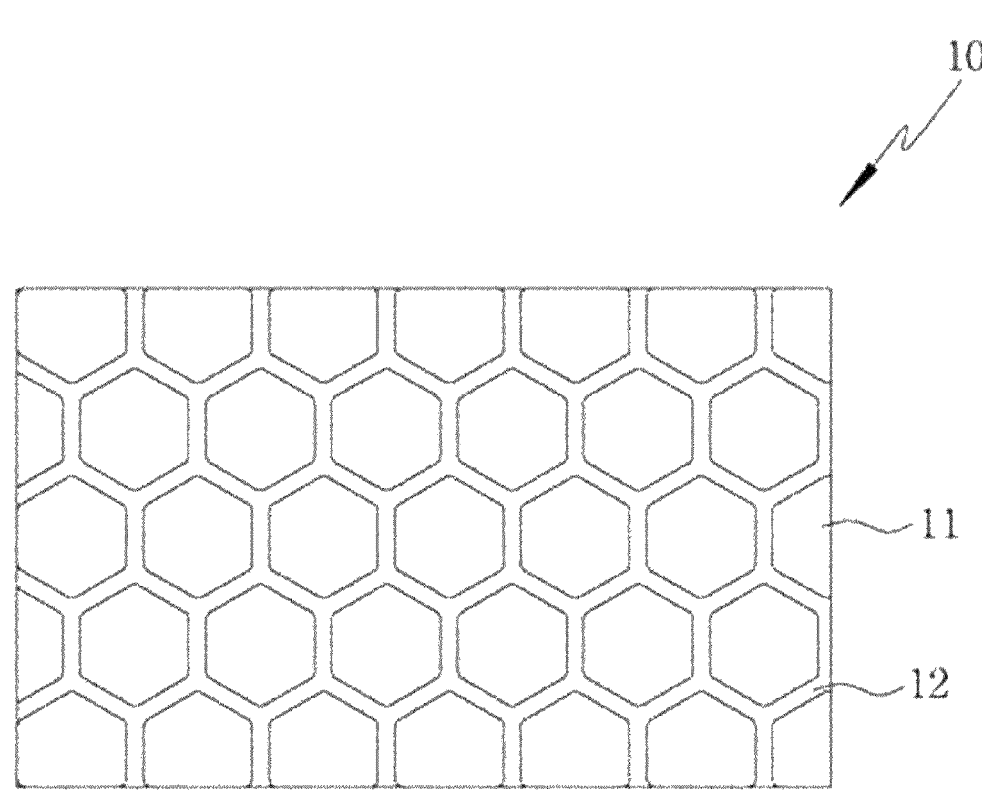
Figure 2:
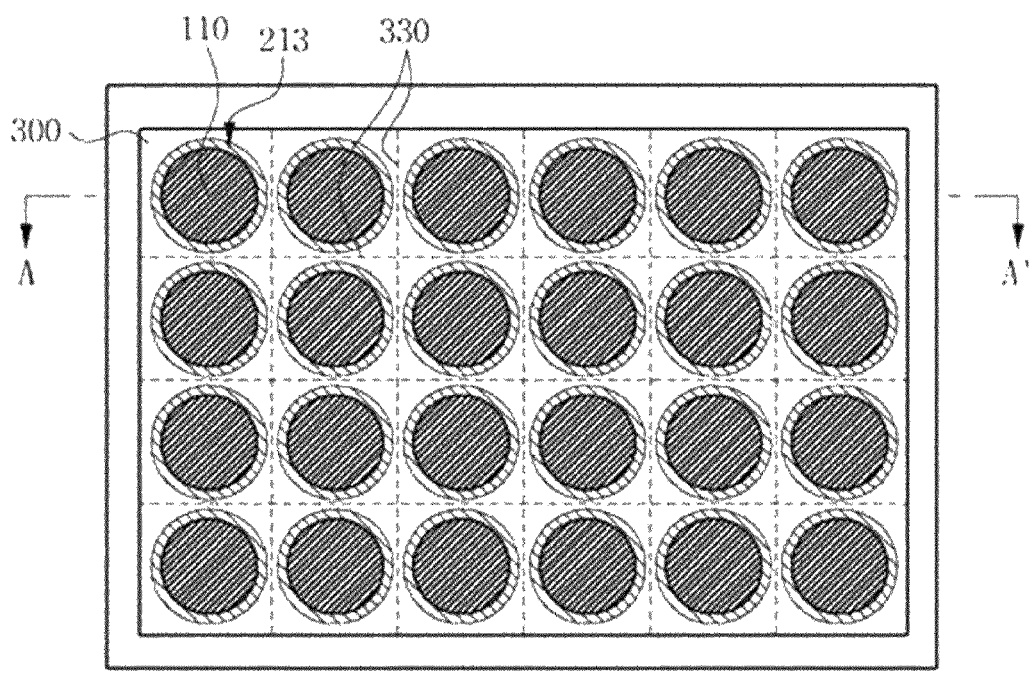
Figure 3:
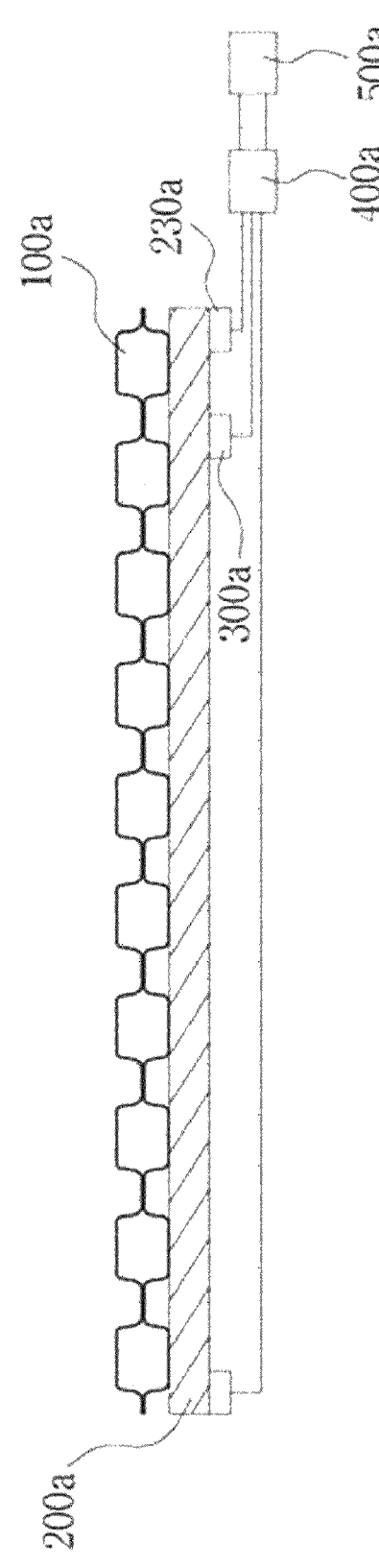
Figure 4:
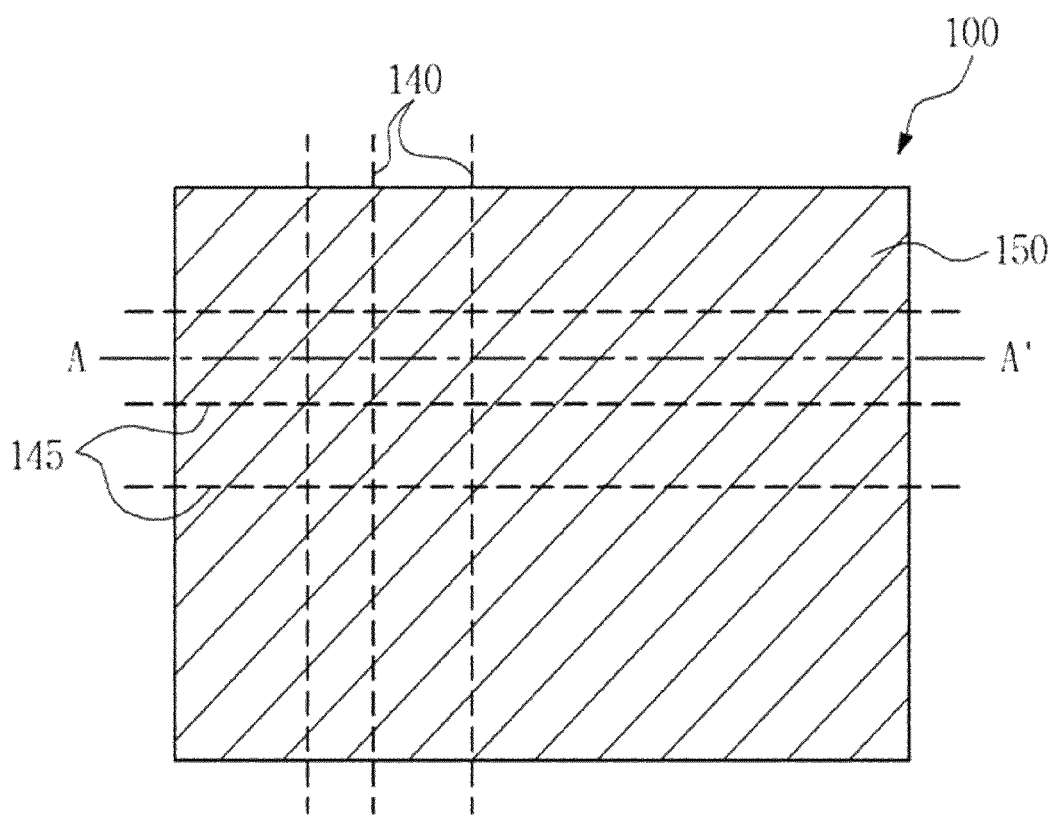
Figure 5:
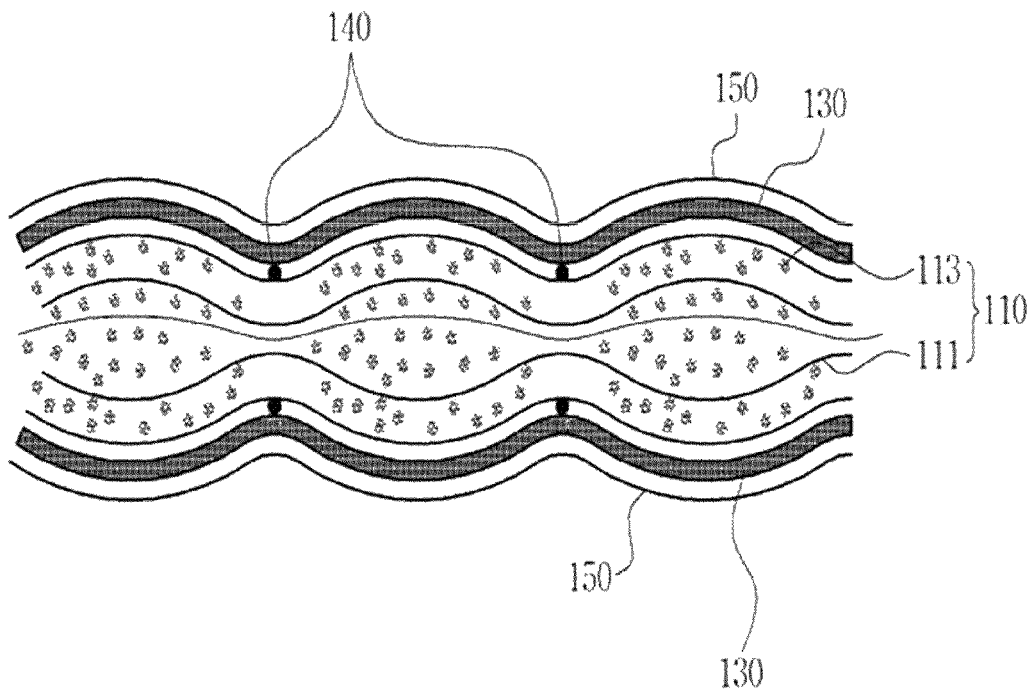
Figure 6:
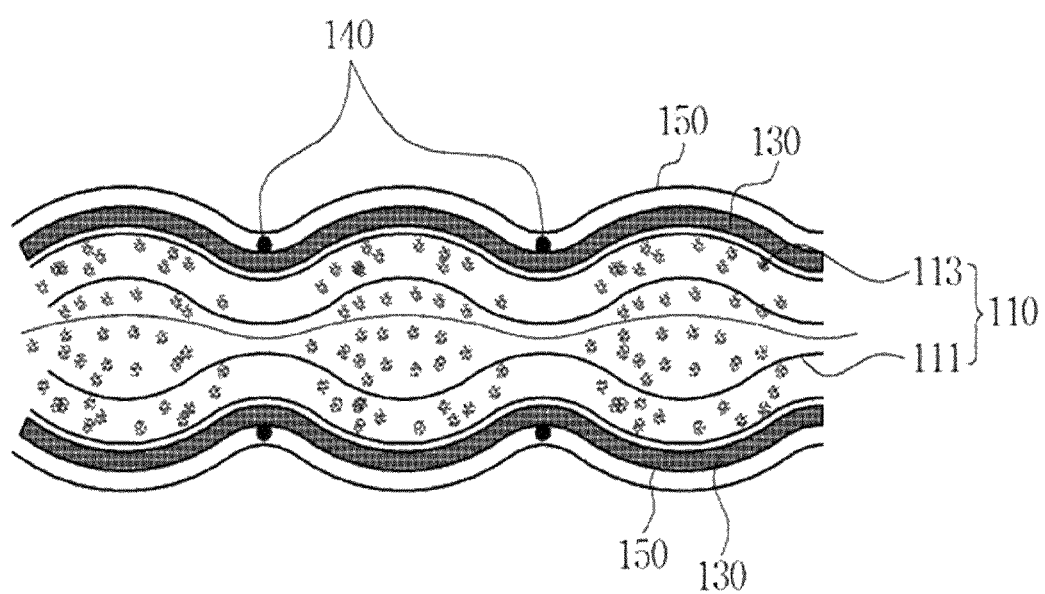
Figure 7:
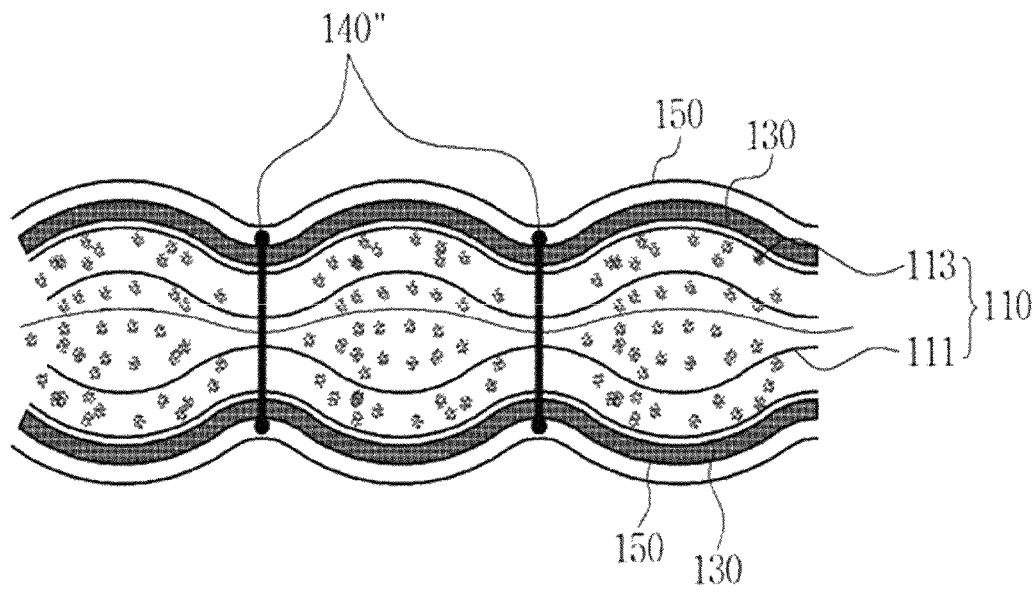
Figure 8:
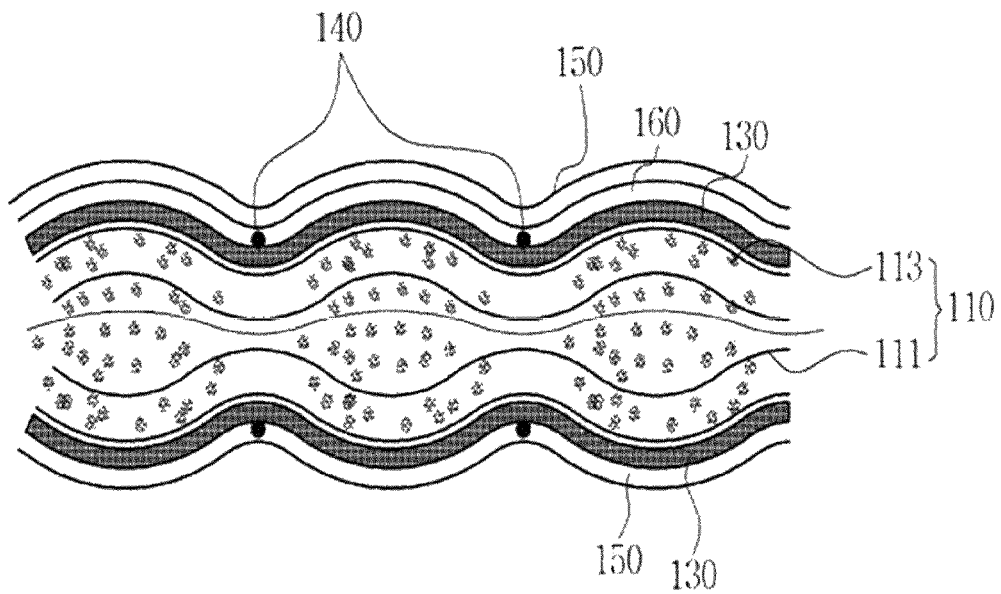
Figure 9:
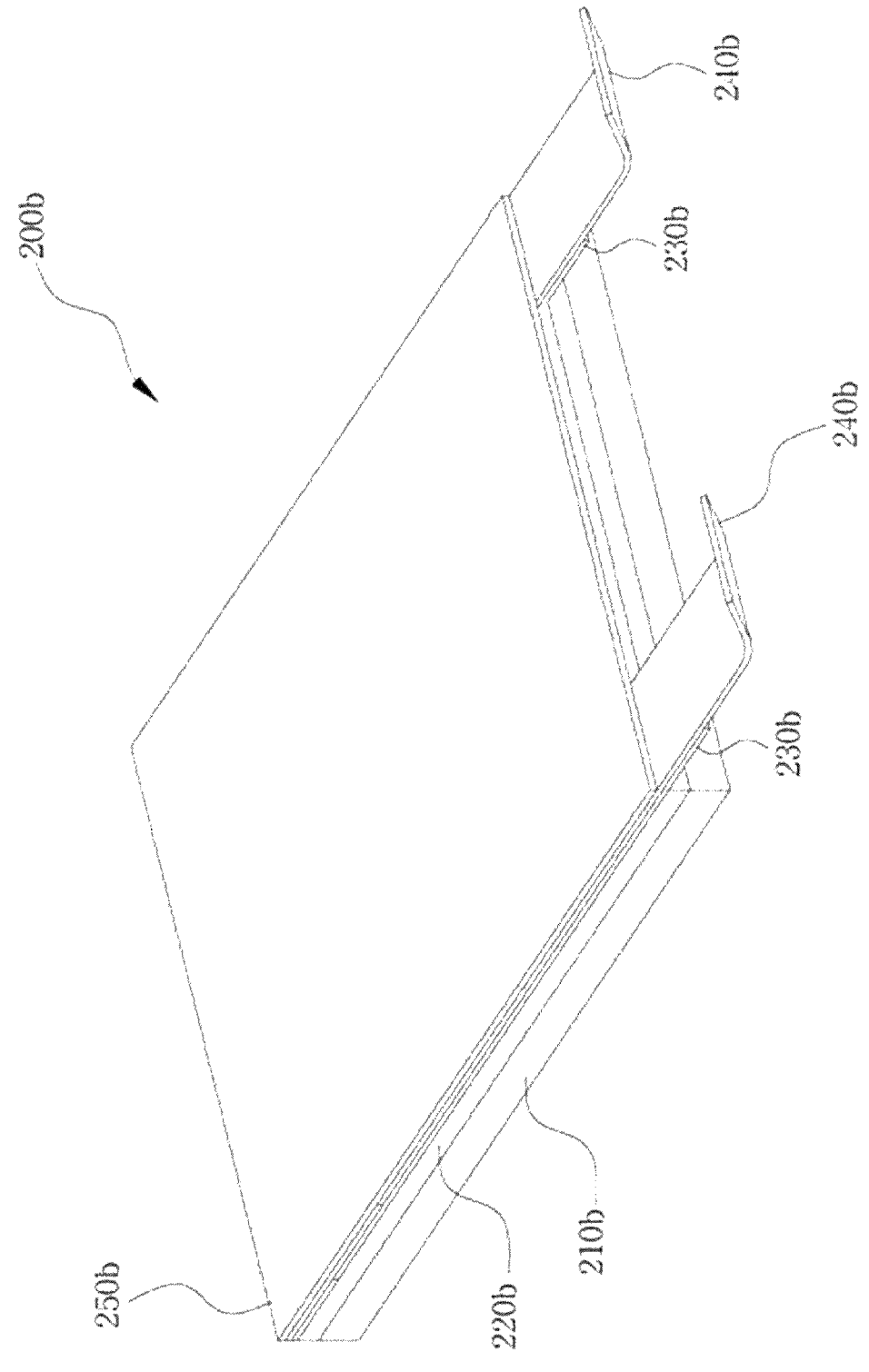

A detailed description of this invention will be provided through specific examples with reference to the following drawings.

Drawing 4 and 5 are a plan view of a single embodiment and a sectional side view that partially shows a section that is cut along the AA' line of the plan view in accordance with this invention.

Here, each is quilted at regular intervals to form various quadrilateral sections resembling a grid pattern by performing quilting and sewing at regular intervals using quilting threads or sewing threads (140 and 145) in the direction of two axes perpendicular to each other for the aerogel blanket (110) with the fiber material (111) impregnated with the aerogel particles (113). A basic insulator is created with a cover layer (130) by applying polyimide through surface treatment of polyimide or liquid plasticity and curable resin in this state.

Although Drawing 4 marks only some strands of the sewing thread in the longitudinal and horizontal directions, it also indicates that the sewing thread is evenly distributed throughout the entire area of the insulator.

At this time, the aerogel blanket (110) passes the fiber material (111) through a processing liquid bath where aerogel particles are formed, including their raw materials, to achieve a state in which the aerogel particles (113) are included using subsequent processes such as drying or curing, and can be formed by overlapping this fiber material (111) by the required thickness as it is or as needed in some situations. In the case of cotton-type insulation, multiple fibers constituting cotton are usually overlapped rather irregularly from the top to the bottom, and these fibers can be considered as substitutes for the multiple fiber materials as shown in the drawing. Therefore, there is no need for overlap, and they can be formed to the required thickness simply from the beginning.

The quilted stitching for an aerogel blanket (110) can be performed in the same way as creating a clothing fabric using conventional quilt stitching. However, in order to prevent sufficiently dried powder-type aerogel particles from escaping from the blanket during the sewing process and contaminating the surrounding working environment, the process must be carried out before the aerogel blanket is completely dried or only after treating the surface of the dried aerogel blanket with non-woven fabric, thin fiber materials, and material injection to prevent the aerogel particles from escaping.

The part where the sewing thread (140) passes through consists of an aerogel blanket (110) made of overlapped fiber materials (111) impregnated with aerogel compressed by the sewing thread (140) for a slim thickness. Since the part in between does not place any pressure on the aerogel-impregnated overlapping fiber material, repulsive force acts between the fibers due to the elasticity of the fibers constituting the material, resembling quite a convex and a state similar to that of a quilt.

A cover layer of liquid polyimide or resin is applied on top of the sewing thread (140) and the aerogel blanket (110), or the cover layer (130) with the non-woven fabric or thin fabric attached to it can cover the entire surface in this state. For example, when forming a polyimide cover layer, imidization of the polyamic acid solution is performed using a polyamic acid solution with a viscosity adjusted to 5,000 to 20,000 cps being applied to the surface of the aerogel blanket, and heat is applied to settle the temperature at 100° C. to 400° C., which creates a solid-state polyimide cover layer.

In this state, the polyimide or resin-coated cover layer (130) will exhibit a three-dimensional form and hold a very wide contact area with the aerogel blanket (110) through partial impregnation to maintain this state with sufficient binding force. In addition, the polyimide or resin-coated cover layer (130), the non-woven fabric, or the cover layer with a thin fabric attached will function to shield the aerogel particles (113) from leaking to the exterior from the aerogel blanket (110) with the appearance of the fabric form maintained.

Therefore, it is possible to prevent dust from blowing in the aerogel insulator or during the manufacturing process of the relevant product, and the initial high insulation performance can be maintained because the polyimide cover layer reduces the likelihood of separation from the aerogel blanket or escaping of the aerogel particles to the exterior even if the use and washing of products containing aerogel insulator create a lot of ceases.

When insulator materials are formed in this state, a process that further combines the enveloping layer (150) forming the surface of the material may be carried out at this time.

Drawing 6 is a sectional side view of another embodiment of this invention.

Here, a polyimide cover layer (130) is formed by applying, curing, or drying liquid polyimide on the surface of the aerogel blanket (110) created by overlapping the fiber materials (111) impregnated with the aerogel particles (113), and each is quilted at regular intervals to form various quadrilateral sections resembling a surface grid pattern insulation fabric similar to that of Drawing 4 by performing quilting and sewing at regular intervals using sewing threads (140) in the direction of two axes perpendicular to each other.

As for these processes, the formation of the aerogel blanket (110), the formation of the polyimide cover layer (130), and the quilt stitching can each be performed similarly to that of the aforementioned embodiment with the order in which each process is performed excluded.

However, in this embodiment, a sewing thread (140) is impregnated with liquid polyimide and does not harden or dry, and has been wiped off the surface of the thread appropriately to prevent the liquid polyimide from flowing on the surface used for quilting. If curing or drying is performed after the quilting treatment, sewing for quilting shall be carried out easily while strengthening the binding force with the polyimide cover layer (130). As shown in the cross-sectional view of Drawing 7, it serves to prevent fine aerogel particles from leaking through the penetrating gap by sealing it with the polyimide impregnated into the thread at the location where the sewing thread (140") and penetrates the polyimide cover layer (130). Of course, this structure may not be formed in consideration of the formation of the enveloping layer created after sewing.

As for the overall appearance of the insulator formed in this way, the overlapping fabric and cover layer are compressed by the sewing thread in the part where the sewing thread passes in a similar manner as described in the previous embodiment as shown in Drawing 4, and the part between them will show a slightly convex form created by the overlapped fabric impregnated with the aerogel.

In this state, a separate enveloping layer (150) constituting the surface of the insulator fabric may be laminated in addition to the cover layer with the polyimide or resin-coated cover layer (130), non-woven fabric, or thin fabric added. The enveloping layer (150) may be constituted of a polyolefin-type synthetic resin layer or a sheet, film, or cloth made of other materials, and the corresponding functional materials can be used to create relevant functional products.

Here, a separate gluing agent or adhesive, or a heat fusion method after adherence can be performed to combine the polyimide or resin-coated cover layer (130) and the cover layer with the non-woven fabric or thin fabric attached to the enveloping layer (150), and it is also possible to form an enveloping layer itself by applying a liquid material and through curing. In addition, the enveloping layer may be formed of multiple layers.

Drawing 8 is a sectional side view of another embodiment of this invention.

Here, the polyimide or resin-coated cover layer (130), or a cover layer with additional non-woven fabric or thin fabric is formed by applying liquid polyimide and curing or drying on the surface of the aerogel blanket (110) as a result of overlapping fiber materials (111) containing the aerogel particles (113). Also, a planar heating element layer (160) is formed on a single surface on top of it, and an enveloping layer (150) or a surface cover layer is formed as a whole in that state.

In this state, quilt stitching is carried out at regular intervals in the directions of two axes that are perpendicular to each other to form grid-patterned insulating materials with multiple rectangular sections.

In accordance with the embodiment, the planar heating element layer (160) is formed on the polyimide or resin-coated cover layer (130) or the cover layer to which a non-woven fabric or thin fabric is added, and it is also possible to treat with quilting stitching in its combined state to form an enveloping layer (150) made of synthetic resin film or cloth on top of it. However, in this case, it may be difficult to combine without peeling since the enveloping layer (150) is combined in an uneven state caused by the quilted stitching process that had been performed previously.

Since the polyimide cover layer (130) itself is a material that is very resistant to heat, no issue of thermal damage is concerned unless the temperature created by the heat generated through the planar heating element layer (160) is extremely high. In addition, the enveloping layer (150) should be formed using a heat-resistant material to prevent thermal damage caused by the planar heating element layer (160).

If the enveloping layer (150) is resistant to heat, it is preferable to laminate and form a heat-resistant material between them. In addition, contamination of the work environment and deterioration of insulation function may occur when processing the material by passing the fine aerogel particles of the aerogel blanket through the gaps between the holes in each layer and the sewing thread (140) created by quilt stitching, it is preferable to adopt a combining method that uses materials and enveloping layers capable of preventing the passing of aerogel particles when forming an enveloping layer.

Here, the planar heating element layer is laminated with an aerogel insulator made of an aerogel blanket to form a heat-generating and insulating functional composite. In this case, the heat generated from the planar heating element does not flow into the aerogel blanket. Therefore, if a product is produced with the power supplied to the planar heating element on the inside of the composite and with the aerogel blanket facing the outside, the insulator can prevent heat leakage to the outside as efficiently as possible, which allows for the internal temperature to be maintained even with a small amount of heat generated.

On the other hand, the planar heating element may be created in various forms in this embodiment.

A planar heating element can be formed by phase-transforming materials with high latent heat or with high heat capacity as heat storage materials. However, in this case, it may be inconvenient in terms of processing and use due to the thickness, or experience thermal restriction.

Therefore, the main planar heating element should be created using an electric heating element with a separate power source and heat generating when current flows in from the power source.

For instance, such a planar heating element may consist of a conductive layer with some resistance for heat generation and may generate heat as current flows through the conductive layer by connecting electrodes to a single side and the opposite side. Also, only the terminal part may be handled separately to safely expose it using a firm conductive member such as a lead wire to prevent damage when forming the conductive layer, and the remaining part can be made to cover both sides of the conductive layer as a separate insulator synthetic resin.

The conductive layer with resistance may consist of a very thin metal film or may be formed by applying and drying a viscous liquid with conductive particles or fibers such as metal paste or carbon nanotubes through various methods like printing. When using printing, the formation of a conductive pattern that covers an area with an even distribution density may be used in addition to the coating of the entire surface.

In addition, a planar heating element may be formed by arranging and fixing a linear wire that has resistance and can generate heat on the non-conductive film so that it passes evenly throughout the entire area rather than a conductive film made of a printed conductive pattern, and the other non-conductive film can be covered after terminal processing to expose both ends for power connection.

In accordance with the previous embodiment, when using the sewing thread for quilting on the top and bottom of the material, it can be created to have the sewing threads evenly distributed on the material to form a planar heating element by using a single-side sewing thread as a conductive resistor. Here, the conductive thread itself may be made of a conductive resistor or made by coating or impregnating a conductive material on a fiber.

On the other hand, when forming a composite material with the planar heating element layer made in the form combined with an insulator, if it is processed after cutting and molding rather than making a product using the whole composite by restricting the parts to be electrical terminals to two, it is difficult to ensure that electrical terminals are maintained as available for use.

Therefore, even after such cutting and processing, it is preferable to distribute the electrical terminals in multiple places to be able to find and select available electrical terminals upon product formation after processing so that the electrical terminals are distributed in various locations on the material to exhibit excellent heating function in the product. In this case, an appropriate terminal is selected for use among the exposed electrical terminals after processing it for commercialization, and a lead wire is coupled to this terminal to make it convenient for power connection.

On the other hand, it is necessary to use a sensor to maintain a specific temperature within a certain range using a planar heating element when using the product. In the case of using a PCT heater which is made at least in part from PTC (positive temperature coefficient) materials, the unique properties of the PTC heater itself allow for it to maintain the temperature within the specified temperature range without requiring a separate sensor.

Drawing 9 is also a perspective view of an example of the planar heating element layer configuration of the embodiment as shown in Drawing 8. As illustrated, the planar heating element layer (200b) includes a heat-resistant material (210b), which is a non-conductor, a carbon nanotube coating layer (220b), which is a resistive conductor, a pair of electrode plate terminals (230b) formed partially on the resistive conductor, a copper lead wire (240b), and an insulating coating layer (250b).

For example, the heat-resistant material (210b) forms a skeleton in which the coating layer (200b) is to be formed. The heat-resistant material (210b) may selectively use any one of polyethylene terephthalate (PET), polyethylene nitrate (PEN), and amide film for low-temperature exothermic properties at 40° C. to 100° C. It is desirable to form multiple micropores on the surface of the heat-resistant material (210b) to allow for the nano-sized carbon nanotube particles to settle easily.

It is preferable that the heat-resistant material (210b) is selected to be freely twisted or bent for convenience for product processing or for product use, and it can be made by mixing an emulsifier in the manufacturing phase of PET, PEN, or amide film to hold properties that are easily bent for use.

The carbon nanotube coating layer (220b) may be formed by spraying a carbon nanotube dispersion on the lower portion of the heat-resistant material (210b). The carbon nanotube coating layer (220b) may be coated with a mass of 4 g/m$^2$ to 10 g/m$^2$ per unit area at this time. A thin film coating structure such as graphene or fullerene may be used in addition to carbon nanotubes (CNT) when forming a heating conductive layer.

Carbon nanotubes have excellent exothermic properties consisting of hexagonal shapes of 6 carbon atoms that are connected to each other to form a tube shape and the diameter of the tube measures only several tens of nanometers. In general, the particle structure of carbon fiber is disconnected even with only 1% of it transformed, however, carbon nanotubes can endure its properties even with a 15% transformation.

A pair of electrode plate terminals (230b) is electrically connected to the carbon nanotube coating layer (220b) at a pre-determined distance of separation. The electrode plate terminal (230b) generates heat in the carbon nanotube coating layer (220b) by applying power to the carbon nanotube coating layer (220b).

The copper lead wire (240a) is placed at the lower part of the pair of electrode plate terminals (230b), respectively, and serves as connection terminals that connect the electrode plate terminals (230b) to a power source.

The insulating coating layer (250b) is formed on the lower portion of the carbon nanotube coating layer (220b). With the insulating coating layer (250b) formed, the electrode plate terminal (230b) and the copper lead wire (240b) may be placed between the insulating coating layer (250b) and the carbon nanotube coating layer (220b).

The material for the insulating coating layer (250b) can include an organic or inorganic material with heat resistance equal to or higher than that of the heat-resistant material (210b), and among them, a ceramic adhesive is preferred the most for use. When the electrode plate terminal (230b) and the carbon nanotube coating layer (220b) are electrically insulated due to the insulating coating layer (250b), oxidation of the carbon nanotube coating layer (220b) is prevented since the carbon nanotube coating layer (220b) cannot come into contact with oxygen.

Here, it exhibits a configuration in which a separate heat-resistant material and an insulating coating layer cover the carbon nanotube coating layer, a resistant conductor, from top to bottom to form a planar heating element layer. However, if the thickness, bendability, and ease of cutting of the composite are considered, it seems possible for the polyimide cover layer (130) of Drawing 8 to replace the heat-resistant material, the enveloping layer (150) to replace the insulating coating layer, and the planar heating element layer (160) to consist of only the carbon nanotube coating layer.

The planar heating element layer may be formed using a transparent heating element (e.g., graphene, carbon nanotube transparent coating, etc.) that can transmit light due to high transparency or a mesh-type planar heating element. For example, the entire functional composite including the heat-insulating layer and the heating layer may consist of a transparent or translucent material if the thickness or distribution is made to be partially transparent to allow for a significant portion of light to pass through, and the planar heating element layer is also created to be transparent or translucent when forming an insulating material such as an aerogel blanket, and uses of such composite material includes a greenhouse or a thermal insulation curtain for a conservatory.

The planar heating element of this invention's composite material introduces the high heat insulating property of the insulator and the passing of a small amount of current. Since it has thermal defense characteristics that use a small amount of current flowing throughout the plane heating element, the thermal efficiency or insulation function can be maximized with a small energy source, allowing for its use in everyday and industrial products (e.g., portable equipment, mobility equipment, construction, plant, etc.) with lightweight and high energy efficiency properties.

When the composite material applying this invention is used to manufacture various products, it is possible to produce products that require maintenance of higher temperatures than the surroundings with a minimum supply of electric heat based on the lightweight and high insulation efficiency properties of aerogel. Therefore, a market for new products can be created in this field, and increasing the efficiency of existing products can eventually increase the market size as a whole.

For example, the composite material of this invention includes a combined structure of insulation and heating and can be used as a constituent in various industrial and household items, such as various functional clothing, bedding, functional special packaging materials, thermal insulation materials such as thermal packs, and detachable thermal curtain heating materials for greenhouses that require the simultaneous use of insulation and heating to increase the efficiency of heating. Such features can particularly be advantageous in products that require lightweight mobility.

In addition, the use of the quilting thread is limited to only the aerogel blanket, and a cover layer and a separate enveloping layer may be placed on its top, and it is also possible to perform quilting with a cover layer included or to expose the sewing thread for quilting on the surface by performing quilting with another synthetic resin sheet, film, cloth, etc. to form a separate enveloping layer while being covered up.

For example, the cover layer is quilted using a non-woven fabric, materials, or hot melt for bonding of various materials such as general materials or aramid materials that can endure high temperatures, and an outermost layer may be formed by applying resin in a solution state to aerogel blanket. A separate enveloping layer is formed on top of it to prevent dust from leaving between the quilting threads, and the enveloping layer can be composed of films, materials, non-woven fabrics, and metal foils of various shapes and materials and the enveloping layer can also be formed by distributing resin throughout in solution state.

In this invention, the sewing thread may be created using various materials, such as nylon thread, aramid that can endure high temperature, metal thread, carbon thread, PTFE thread, etc., and a synthetic resin such as liquid polyimide (a concept that includes all liquid substances that form polyimide through subsequent curing or drying treatment) is impregnated for use to allow for the insulator to be subsequently formed with a solidified synthetic resin layer on the surface of the quilted thread. As a result, this synthetic resin layer can serve to fill in fine gaps at the sewing site.

In this invention, for example, if the polyimide forms the synthetic resin cover layer, a method of applying liquid polyimide to the aerogel blanket and allowing a certain portion from the surface of the aerogel blanket to penetrate into the interior before forming a solid polyimide layer can be used or a method of laminating and heating a plastic polyimide sheet on the surface of the aerogel blanket for penetration can also be used.

The planar heating element in this invention may adopt a planar heating element of various existing alternating current (AC) or direct current (DC).

Although the above has been described with reference to the illustrated embodiment, this is only an example, and there is potential for various modifications by those with general knowledge in this technical field and they will understand that all or part of the embodiment described above may be configured through selective combining. Therefore, the scope of true technical protection of this invention should be determined based on the technical idea of the attached scope of a request for a patent.

100: Insulator 110: Aerogel blanket
111: Fiber material 113: Aerogel particle
130: Cover layers 140, 140', 140", 145: Sewing thread
150: Enveloping layer 160: Planar heating element layer

The invention claimed is:

1. An aerogel blanket insulator, comprising:
an aerogel blanket formed to include aerogel particles;
a sewing thread used to quilt the whole aerogel blanket; and
a cover layer covering a surface of the aerogel blanket,
wherein the aerogel blanket insulator includes the aerogel blanket made of insulation of an elastic member and the sewing thread is created to quilt only the aerogel blanket, wherein the cover layer is formed by penetrating a synthetic resin through a partial thickness of the aerogel blanket, and
wherein the sewing thread is impregnated with the synthetic resin so as to seal gaps at a sewing portion where the sewing thread penetrates the cover layer of the aerogel blanket.

2. The aerogel blanket insulator according to claim 1, further comprising a separate enveloping layer that covers the cover layer, wherein the elastic member comprises cotton.

3. The aerogel blanket insulator according to claim 1, wherein the cover layer is formed by
applying liquid polyimide or synthetic resin to a surface of the aerogel blanket, or by combining non-woven fabric or thin fabric on a layer composed of the liquid polyimide or
resin.

4. A functional composite with the aerogel blanket insulator of claim 1, comprising:
an additional planar heating element layer on the cover layer on a single side of the aerogel blanket.

5. The functional composite according to claim 4, wherein the planar heating element layer includes a resistive conductive layer that generates heat when current flows, and the resistive conductive layer is formed to cover an entire surface of the aerogel blanket or formed in a pattern by attachment, printing, or coating according to a specific pattern.

6. The functional composite according to claim 4, wherein the planar heating element is composed of a metal thin film or formed by applying and drying a viscous liquid with conductive particles or fibers, and wherein a conductive sewing thread on a single side of the aerogel blanket forms a part of the planar heating element functioning as a conductive resistor, while a separate sewing thread is used on a top and a bottom of the aerogel blanket for quilting.

7. The functional composite according to claim 4, wherein the planar heating element is formed by distributing at least two electrical terminals in multiple locations, and wherein the planar heating element includes PTC heaters made at least in part from PTC materials.

* * * * *